JOHN A. LIVINGSTON, OF NEW YORK, N. Y.

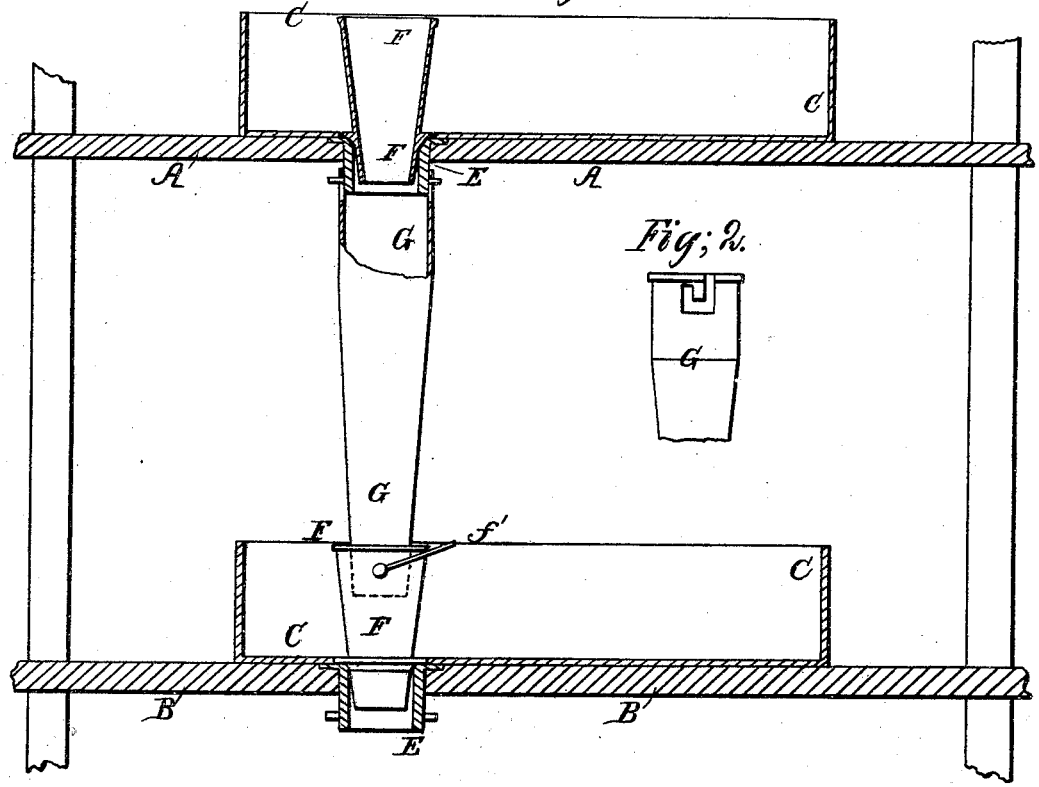

Letters Patent No. 86,237, dated January 26, 1869.

IMPROVED DEVICE FOR TRANSFERRING SIRUPS, SUGAR, AND OTHER MATERIALS FROM UPPER TO LOWER FLOORS.

The Schedule referred to in these Letters Patent and making part of the same.

*To all whom it may concern:*

Be it known that I, JOHN A. LIVINGSTON, of the city, county, and State of New York, have invented a new and improved Hollow Stopple for Tanks, Bins, &c.; and I do hereby declare that the following is a full, clear, and exact description thereof, which will enable others skilled in the art to make and use the same, reference being had to the accompanying drawings, forming part of this specification, in which—

Figure 1 is a vertical section of a portion of a sugar-house, illustrating my invention.

Figure 2 is a detail view of a portion of the connecting-pipe.

Similar letters of reference indicate corresponding parts.

My invention has for its object to furnish an improved device, by means of which sugar and sirups in sugar-houses, grain in store-houses, and other similar substances may be passed from an upper to a lower floor through tanks or bins filled with dry or liquid substances, without becoming intermingled with the contents of said bins or tanks; and It consists in the hollow stopple and its socket, and in the combination therewith of a detachable connecting-pipe, the whole being constructed and arranged as hereinafter more fully described.

A and B represent two successive floors of a sugar-house, upon which are arranged the tanks or bins C, the bins or tanks of the one floor being directly over those of the next floor, as shown in fig. 1.

In the bottom of each tank, vat, or bin C, is placed a socket, E, connected with the bottom of the vat in such a way as to be water-tight. The lower end of the socket E projects below the floor upon which the bin or tank C stands.

F is the hollow stopple, the lower end of which, when the vat or bin is to contain a liquid, or anything of a liquid nature, should be ground into the socket E, so that there may be no leakage from the vat or tank to the stopple, or from the stopple to the tank. When the bins contain grain or other dry substances, the connections need not necessarily be so tight. The stopples F should be so long that their upper ends may project a little above the top of the tank, vat, or bin C, or, at least, above the highest point at which the contents of said bin or vat will ever stand.

G is a connecting-pipe, the upper end of which is detachably connected to the lower end of the socket E by means of a bayonet-clutch, as shown in figs. 1 and 2, or by other convenient means. The pipe G should be made so long that, when its upper end is attached to the socket E of an upper tank or bin, its lower end may enter the upper end of the next lower stopple, as shown in fig. 1.

For convenience in removing the hollow stopples F, they may have a bail, *f'*, or other handle, attached to their upper ends, as shown in fig. 1.

With this arrangement, when it is desired to draw off the contents of a tank or bin, the sockets E and hollow stopples F are connected by the connecting-pipes G from the tank or bin from which the contents are to be drawn down to the tank or bin into which the said substance is to be placed. The stopple of the tank or bin from which the contents are to be drawn off is then withdrawn, allowing the substance, whether dry or liquid, to flow down to its place without disturbing the contents of the vats or bins through which it may pass, or being disturbed by said contents.

I claim as new, and desire to secure by Letters Patent—

1. The removable hollow stopple F and stationary sockets E, in combination with each other and with the tanks or bins C, substantially as herein shown and described, and for the purpose set forth.

2. Connecting the stationary socket E of an upper tank or bin with the removable hollow stopple F of the next lower tank or bin, by means of a detachable connecting-pipe, G, substantially as herein shown and described, and for the purpose set forth.

The above specification of my invention signed by me, this 12th day of June, 1868.

JOHN A. LIVINGSTON.

Witnesses:
FRANK BLOCKLEY,
JAMES T. GRAHAM.